United States Patent
Mitchell et al.

(10) Patent No.: US 8,140,688 B2
(45) Date of Patent: Mar. 20, 2012

(54) METHOD AND SYSTEM FOR ESTABLISHING CONNECTIONS BETWEEN NODES IN A COMMUNICATION NETWORK

(75) Inventors: John O. Mitchell, Raleigh, NC (US); Sakthimurugan Arumugam, Bangalore (IN); Srinivasan Sivaraman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/560,966

(22) Filed: Sep. 16, 2009

(65) Prior Publication Data

US 2011/0066736 A1    Mar. 17, 2011

(51) Int. Cl.
    *G06F 15/16*    (2006.01)
(52) U.S. Cl. ......... 709/227; 709/228; 709/223; 709/230
(58) Field of Classification Search .......... 709/227–228, 709/223–224, 230
    See application file for complete search history.

(56) References Cited

U.S. PATENT DOCUMENTS

| | | | |
|---|---|---|---|
| 5,109,483 A * | 4/1992 | Baratz et al. | 709/227 |
| 6,590,905 B1 * | 7/2003 | Suumaki et al. | 370/466 |
| 6,865,178 B1 | 3/2005 | Euget et al. | |
| 7,779,134 B1 * | 8/2010 | DeLiberato et al. | 709/227 |
| 2004/0103201 A1 | 5/2004 | Oh | |
| 2004/0264411 A1 * | 12/2004 | Rasanen et al. | 370/331 |
| 2006/0262742 A1 * | 11/2006 | Dommaraju et al. | 370/328 |
| 2007/0223524 A1 | 9/2007 | Ala-Vannesluoma | |
| 2008/0004022 A1 * | 1/2008 | Johannesson et al. | 370/331 |
| 2009/0262661 A1 * | 10/2009 | Ueda et al. | 370/254 |

FOREIGN PATENT DOCUMENTS

WO    WO2005/089002 A1    9/2005

\* cited by examiner

*Primary Examiner* — Philip B Tran
(74) *Attorney, Agent, or Firm* — Scully, Scott, Murphy & Presser, P.C.; Joseph E. Bracken, Esq.

(57) ABSTRACT

A method, system and article of manufacture are disclosed for establishing a connection between a plurality of nodes in a communication network, the plurality of nodes including at least first and second nodes. The method comprises the steps of verifying availability of the second node by the first node; and sending an exchange identification request by the first node to the second node, this request including information related to protocols supported by the first node. An exchange identification response is received by the first node from the second node, this response including information related to protocols supported by the second node. Also, the verifying step includes the steps of sending a request to the second node to initiate a link level connection between the first node and the second node, and confirming this connection upon receiving a response from the second node.

18 Claims, 4 Drawing Sheets

EXISTING SCENARIO FOR EEDLC:
PRIMARY WORKSTATION:
MAINFRAME(HOST)             COMMAND

102 ⎰ 253 IBMEEDLC  0925E3A50404    SEND              ------------NULL
    │ XID RQ --------------> 04:49:32:21
    │ 285 IBMEEDLC  0925E3A50405    RECV              <------------NULL
    │ XID RSP -------------> 04:49:32:21
    │ 326 IBMEEDLC  0925E3A50405    RECV              <------------NULL
    ⎱ XID RQ --------------> 04:49:32:24

104 ⎰ 379 IBMEEDLC 00 0925E3A50405  SEND  (PN)        ---------------XID
    │ RSP ----------------> 04:49:32:24
    │ 434 IBMEEDLC 00 0925E3A50404  SEND  (PN)        ---------------XID
    │ RQ -----------------> 04:49:32:25
    │ 456 IBMEEDLC 00 0925E3A50404  RECV  (PN)        <---------------XID
    │ RQ -----------------> 04:49:32:25
    │ 517 IBMEEDLC 00 0925E3A50405  RECV  (NP)        <---------------XID
    │ RSP ----------------> 04:49:32:25
    │ 583 IBMEEDLC 00 0925E3A50405  SEND  (NP)        ---------------XID
    │ RSP ----------------> 04:49:32:27
    │ 619 IBMEEDLC 00 0925E3A50404  RECV  (NP)        <---------------XID
    │ RQ -----------------> 04:49:32:27
    │ 685 IBMEEDLC 00 0925E3A50405  SEND  (NP)        ---------------XID
    │ RSP ----------------> 04:49:32:27
    │ 742 IBMEEDLC 00 0925E3A50404  SEND  (NP)        ---------------XID
    │ RQ -----------------> 04:49:32:27
    │ 766 IBMEEDLC 00 0925E3A50404  RECV  (NP)        <---------------XID
    │ RSP ----------------> 04:49:32:27
    │ 873 IBMEEDLC 00 0925E3A50405  RECV  (NP)        <---------------XID
    ⎱ RSP ----------------> 04:49:32:27
                                    (XID DON RSP)     <------------XID
    DONE RSP -------------
                                    (SET MODE)        ------------SET
    MODE ---------------->

NOTE:
RQ - REQUEST
RSP - RESPONSE
PN - PRE NEGOTIATION
NP - NEGOTIATION PROCEEDING

PRIOR ART

FIG. 1

METHOD AND SYSTEM FOR ESTABLISHING CONNECTIONS BETWEEN NODES IN A COMMUNICATION NETWORK

BACKGROUND OF THE INVENTION

1. Field of the Invention

This invention generally relates to multi-node communication or computer networks, and more specifically, the invention relates to establishing connections or links between nodes of such networks.

2. Background Art

In many multi-node communication systems, such as computer systems having a Systems Network Architecture (SNA), links must be established between two nodes of the system before these nodes can fully communicate with each other. Various standard procedures are known for establishing these links. These known procedures include EEDLC (Enterprise Extender Data Link Control) and LLC2 (Logical Link control type 2).

In these procedures, a first, or primary, node, trying to connect with a second, or secondary, node, will attempt to determine the availability of that secondary node. Each of these nodes may also attempt to determine various parameters of the other node such as node type, Node ID, Link Station role etc. Still other parameters, maximum I-field length that sender can receive, may be negotiated during the connection attempt. If the second node is ready, willing and able to work with the first node, a successful connection between the nodes may be established. However, if the two nodes are not able to communicate together, the second node may send to the first node a message indicating a failed connection attempt.

In these connection efforts, numerous messages may be exchanged between the nodes during the connection effort. In the existing scenario, both the primary (mainframe side) node and secondary (SNA node) node starts with a TEST command (followed by a NULL XID in case of LLC2) or a NULL XID (in case of EEDLC). Then both the partners send XID's back and forth before establishing the link. The reason for sending multiple XID's is that, the XID state is progressively moved from one state to the next after receiving a positive response from the partner.

FIG. 1 shows, as an example, the requests, responses and negotiations that may be exchanged between two nodes as they attempt to establish a connection. As can be seen, a multitude of messages are needed. These messages may consume considerable bandwidth. In addition, a significant amount of time may be needed before all the messages and negotiations are completed. There is no known solution to reduce these XID flows.

SUMMARY OF THE INVENTION

An object of the present invention is to simplify procedures for establishing connections between nodes of a multi-node communication system.

Another object of this invention is to reduce the number of exchanges between nodes of a multi-node communication system while establishing a connection between the nodes.

A further object of the invention is to reduce the data traffic needed to establish a connection between two nodes of a communication network.

These and other objectives are attained with a method, system and article of manufacture for establishing a connection between a plurality of nodes in a communication network, the plurality of nodes including a first node and a second node. The method comprises the steps of verifying availability of the second node by the first node; and sending an exchange identification (XID) request by the first node to the second node, the XID request including information related to protocols supported by the first node.

An exchange identification (XID) response is received by the first node from the second node, the XID response including information related to protocols supported by the second node. Also, the verifying step includes the steps of sending a request to the second node to initiate a link level connection between the first node and the second node, and confirming the link level connection upon receiving a response from the second node.

In the preferred embodiment, the step of sending the exchange identification request comprises the steps of identifying protocols supported by the first node; arranging, in a predetermined sequence, information related to the protocols supported by the first node; and forwarding the arranged information in a single XID request by the first node to the second node. In addition, preferably, the receiving step comprises the step of receiving information related to protocols supported by the second node, wherein the second node forwards the received information in a single XID response to the first node, the received information being arranged in a predetermined sequence. In this embodiment of the invention, intermediate XID requests and responses to the intermediate XID requests are reduced.

In a preferred implementation of the invention, described below in detail, either of the partners can start with a PROBE command to verify the reachability of the other partner. When the primary (the side initiating the communication) node gets a response back from the secondary (remote) node for the PROBE command, then the primary partner can start with XID command with its capabilities. When the remote partner agrees with the capability of the primary then the secondary can send positive XID response back to the primary node. The primary node can then send a Set Mode to complete successful link activation.

In case the secondary node cannot accept the primary node's capabilities, the secondary node can send a negative response along with its capabilities. If the primary node accepts the capabilities of the secondary node then it will send Set Mode to complete successful link activation. If the primary node cannot accept the capabilities of the secondary node, it can send a Disconnect Mode (DM) to complete failure of link activation.

In the current implementation, bringing up the link consumes more time and utilizes more CPU cycles of the mainframe. This, in turn, requires the customer to pay more. Additionally, the current methodology also causes lot of data traffic on the network.

The preferred embodiment of the invention provides a number of important advantages. For example, this embodiment of the invention reduces the time for bringing up the link, increases link efficiency, and lowers the number of link failure. In addition, the present invention may be used to reduce the number of re-transmission due to packet loss, reduce the CPU cycle needed for bringing up the link, and improve the network bandwidth usage by not sending XID's when the partner is not reachable.

The number of XID's transmitted in the preferred implementation may be only 40% of the existing implementation. This invention may be very helpful to, among others, any software organization developing application/product in the SNA space.

Further benefits and advantages of this invention will become apparent from a consideration of the following detailed description, given with reference to the accompanying drawings, which specify and show preferred embodiments of the invention.

BRIEF DESCRIPTION OF THE DRAWINGS

FIG. 1 shows the requests and responses used in a current procedure to establish a connection between nodes in a System Network Architecture.

DETAILED DESCRIPTION OF THE PREFERRED EMBODIMENTS

Figure 2:
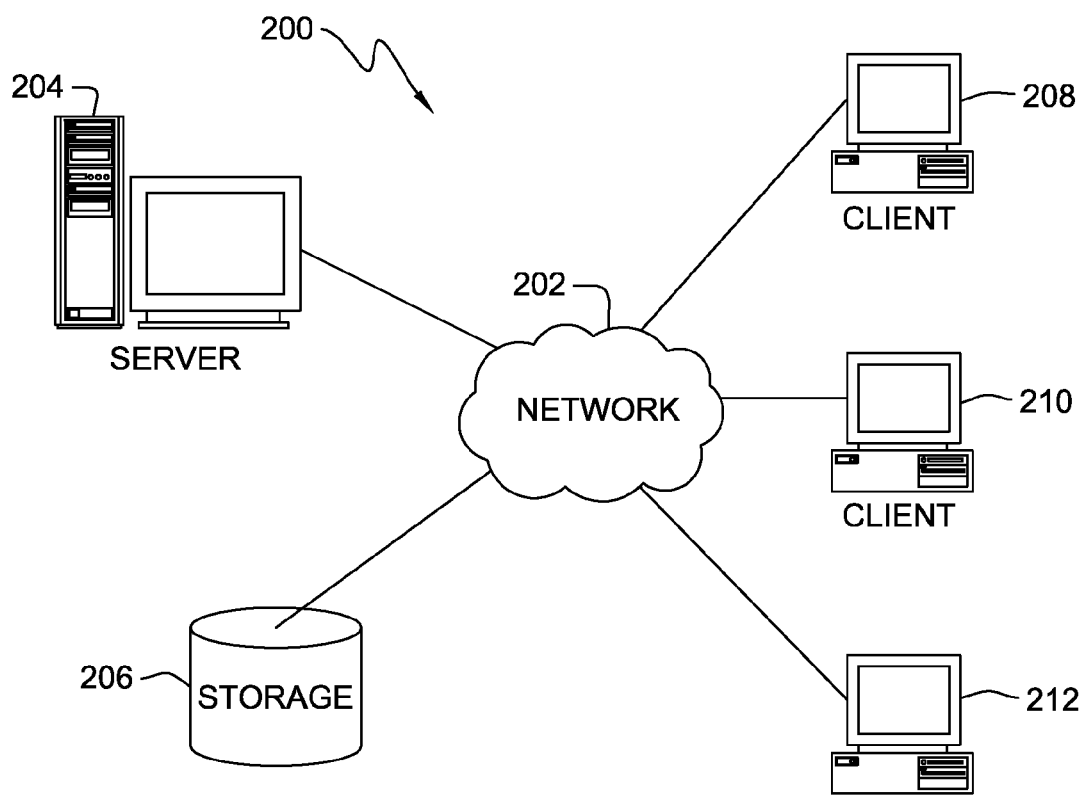
FIG. 2 is an exemplary diagram of a distributed data processing system in which the present invention may be implemented.

The present invention, generally, provides a method and system for establishing connections between a plurality of nodes in a communication network, and FIG. 2 depicts a pictorial representation of a network in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables or SNA capable links.

In the depicted example, server 204 is connected to network 202 along with storage unit 206. In addition, clients 208, 210, and 212 are connected to network 202. These clients 208, 210, and 212 may be, for example, personal computers or network computers. In this example, server 204 provides data, such as boot files, operating system images, and applications to clients 208-212. Clients 208, 210, and 212 are clients to server 204. Network data processing system 200 may include additional servers, clients, and other devices not shown.

In the illustrated example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

As mentioned above, the present invention provides a method, system and article of manufacture for establishing a connection between a plurality of nodes in a communication network, the plurality of nodes including a first node and a second node. The method comprises the steps of verifying availability of the second node by the first node; and sending an exchange identification (XID) request by the first node to the second node, the XID request including information related to protocols supported by the first node.

An exchange identification (XID) response is received by the first node from the second node, the XID response including information related to protocols supported by the second node. Also, the verifying step includes the steps of sending a request to the second node to initiate a link level connection between the first node and the second node, and confirming the link level connection upon receiving a response from the second node.

In the preferred embodiment, the step of sending the exchange identification request comprises the steps of identifying protocols supported by the first node; arranging, in a predetermined sequence, information related to the protocols supported by the first node; and forwarding the arranged information in a single XID request by the first node to the second node. In addition, preferably, the receiving step comprises the step of receiving information related to protocols supported by the second node, wherein the second node forwards the received information in a single XID response to the first node, the received information being arranged in a predetermined sequence. In this embodiment of the invention, intermediate XID requests and responses to the intermediate XID requests are reduced.

Figure 3:
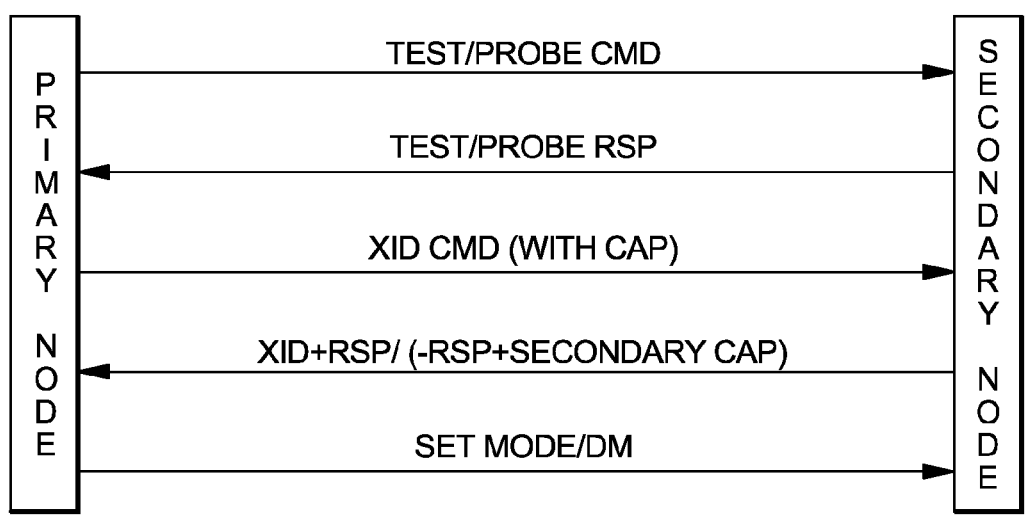
FIG. 3 illustrates a set of message exchanges, used in accordance with a preferred embodiment of the present invention, to establish a connection between nodes of a communication system.

More specifically, with reference to FIG. 3, either of the partners can start with a PROBE command to verify the reachability of the other partner. When the primary (the side initiating the communication) node gets a response back from the secondary (remote) node for the PROBE command, then the primary partner can start with XID command with its capabilities. When the remote partner agrees with the capability of the primary then the secondary can send positive XID response back to the primary node. The primary node can then send a Set Mode to complete successful link activation.

In case the secondary node cannot accept the primary node's capabilities, the secondary node can send a negative response along with its capabilities. If the primary node accepts the capabilities of the secondary node then it will send Set Mode to complete successful link activation. If the primary node cannot accept the capabilities of the secondary node, it can send a Disconnect Mode (DM) to complete failure of link activation.

The Probe command is used during connection establishment to determine the reachability of the partner during link activation and compatibility of the protocol stack, including the ability to support the new XID format disclosed herein.

With reference to FIGS. 1 and 3, the steps identified at 102 in FIG. 1 are replaced by TEST/PROBE Command/Response of FIG. 3. Steps identified at 104 in FIG. 1 are replaced by the XID Command Response of FIG. 3. In this implementation of the invention, all of the capabilities and all of the partner capabilities are received in one XID Request/Response Transmission. Hence, there are no intermediate XID states and so no movement from one state to the next is required. This reduces the number of XID's transmitted.

The preferred embodiment of the invention provides several significant advantages. For instance this embodiment of the invention reduces the time for bringing up the link, increases link efficiency, and lowers the number of link failure. In addition, the present invention may be used to reduce the number of re-transmission due to packet loss, reduce the CPU cycle needed for bringing up the link, and improve the network bandwidth usage by not sending XID's when the partner is not reachable.

The number of XID's transmitted in the preferred implementation may be only 40% of the existing implementation.

This invention may be very helpful to, among others, any software organization developing application/product in the SNA space.

Figure 4:
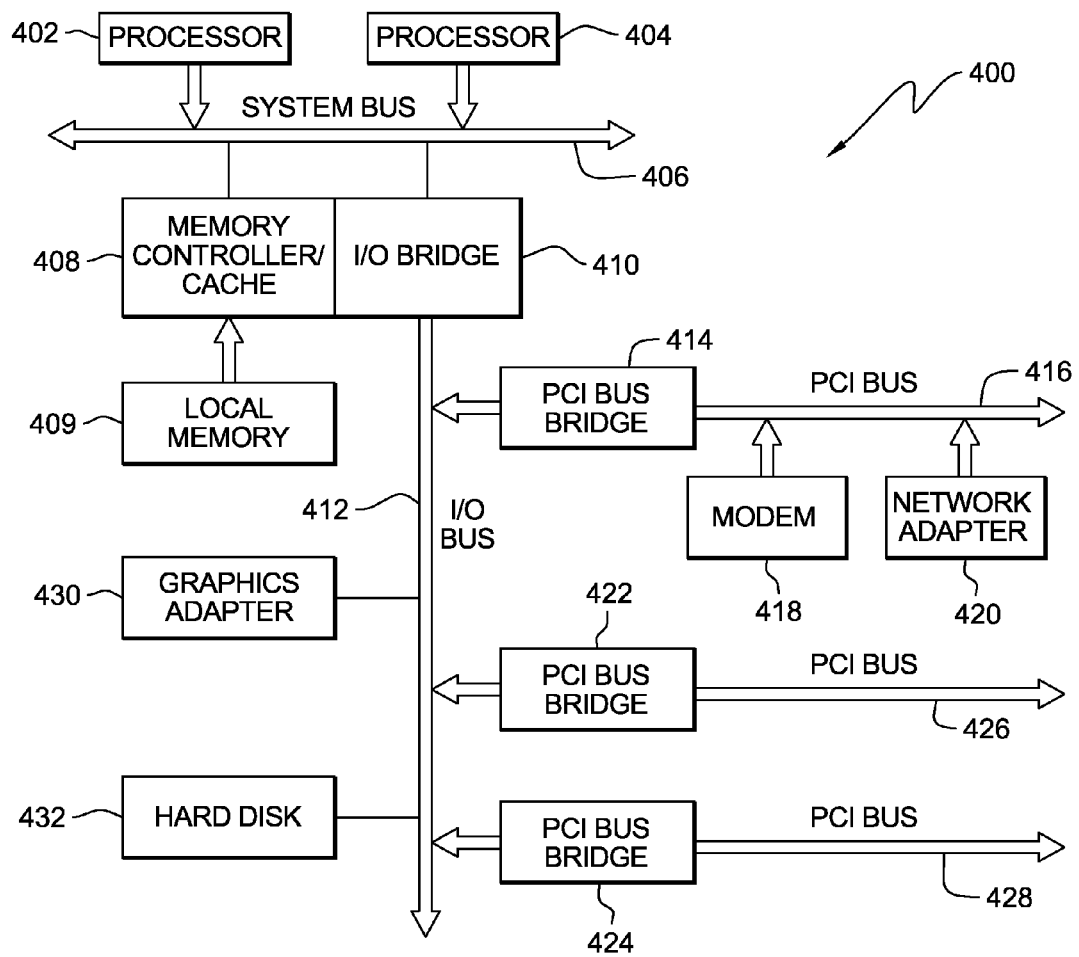
FIG. 4 is an exemplary diagram of a server-computing device that may be used as a server in the system of FIG. 2.

Referring to FIG. 4, a block diagram of a data processing system that may be implemented as a server, such as server 204 in FIG. 2, is depicted in accordance with a preferred embodiment of the present invention. Data processing system 400 may be a symmetric multiprocessor (SMP) system including a plurality of processors 402 and 404 connected to system bus 406. Alternatively, a single processor system may be employed. Also connected to system bus 406 is memory controller/cache 408, which provides an interface to local memory 409. I/O bus bridge 410 is connected to system bus 406 and provides an interface to I/O bus 412. Memory controller/cache 408 and I/O bus bridge 410 may be integrated as depicted.

Peripheral component interconnect (PCI) bus bridge 414 connected to I/O bus 412 provides an interface to PCI local bus 416. A number of modems may be connected to PCI local bus 416. Typical PCI bus implementations will support four PCI expansion slots or add-in connectors. Communications links to clients may be provided through modem 418 and network adapter 420 connected to PCI local bus 416 through add-in boards.

Additional PCI bus bridges 422 and 424 provide interfaces for additional PCI local buses 426 and 428, from which additional modems or network adapters may be supported. In this manner, data processing system 400 allows connections to multiple network computers. A memory-mapped graphics adapter 430 and hard disk 432 may also be connected to I/O bus 412 as depicted, either directly or indirectly.

Those of ordinary skill in the art will appreciate that the hardware depicted in FIG. 4 may vary. For example, other peripheral devices, such as optical disk drives and the like, also may be used in addition to or in place of the hardware depicted. The depicted example is not meant to imply architectural limitations with respect to the present invention.

Figure 5:
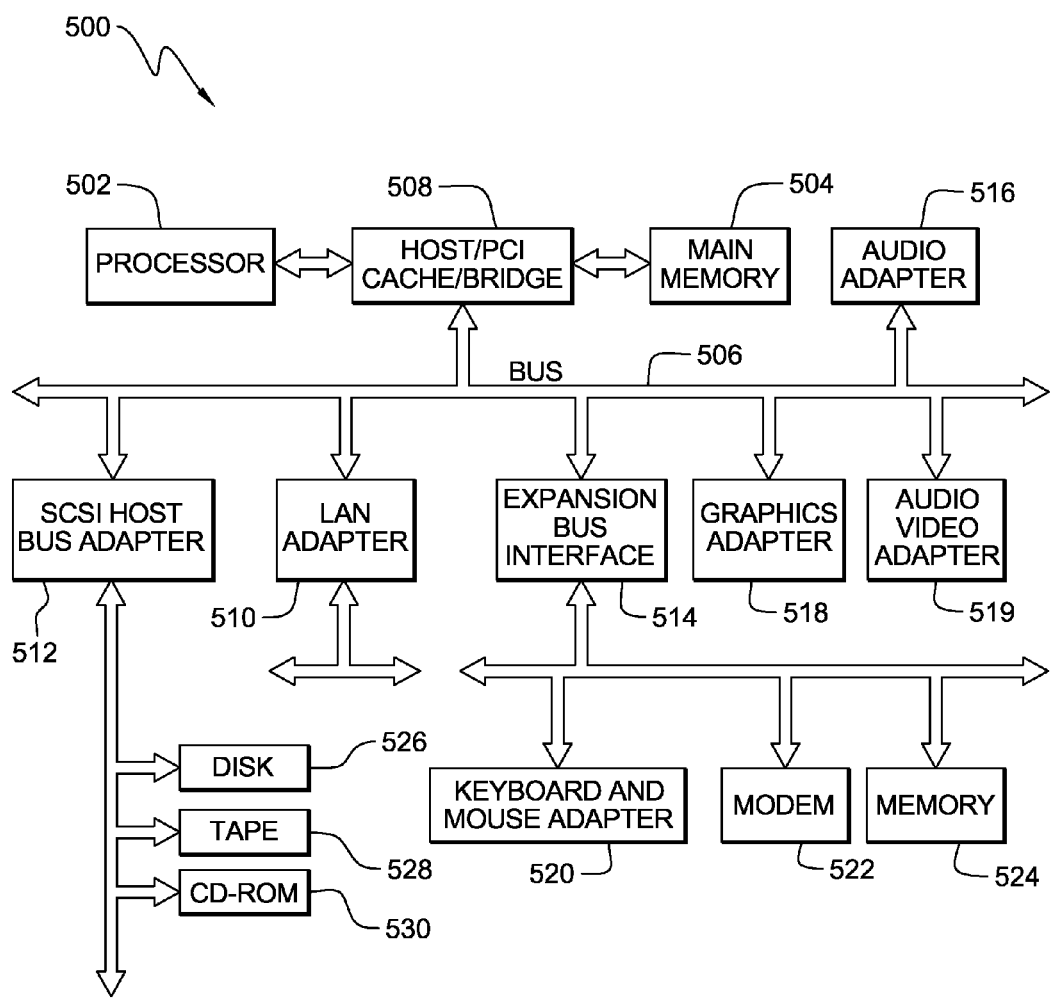
FIG. 5 is an exemplary diagram of a client device that may be used in the system of FIG. 2.

The data processing system depicted in FIG. 4 may be, for example, an IBM eServer pSeries system, a product of International Business Machines Corporation in Armonk, N.Y., running the Advanced Interactive Executive (AIX) operating system or LINUX operating system. With reference now to FIG. 5, a block diagram illustrating a data processing system is depicted in which the present invention may be implemented. Data processing system 500 is an example of a client computer. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards.

In the example given in FIG. 5, local area network (LAN) adapter 510, SCSI host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. Small computer system interface (SCSI) host bus adapter 512 provides a connection for hard disk drive 526, tape drive 528, and CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as Windows XP, which is available from Microsoft Corporation. An object oriented programming system such as Java may run in conjunction with the operating system and provide calls to the operating system from Java programs or applications executing on data processing system 500. "Java" is a trademark of Sun Microsystems, Inc. Instructions for the operating system, the object-oriented operating system, and applications or programs are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash read-only memory (ROM), equivalent nonvolatile memory, or optical disk drives and the like, may be used in addition to or in place of the hardware depicted in FIG. 5. Also, the processes of the present invention may be applied to a multiprocessor data processing system.

As another example, data processing system 500 may be a stand-alone system configured to be bootable without relying on some type of network communication interfaces As a further example, data processing system 500 may be a personal digital assistant (PDA) device, which is configured with ROM and/or flash ROM in order to provide non-volatile memory for storing operating system files and/or user-generated data.

The depicted example in FIG. 5 and above-described examples are not meant to imply architectural limitations. For example, data processing system 500 also may be a notebook computer or hand held computer in addition to taking the form of a PDA. Data processing system 500 also may be a kiosk or a Web appliance.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for establishing a connection between a plurality of nodes in a communication network, the plurality of nodes including a first node and a second node, the method comprising the steps of:
   verifying availability of the second node by the first node, including the first node sending a probe command to the second node to verify reachability of the second node and to initiate a link level connection between the first node and the second node, and the second node, in response to receiving the probe command, sending a probe response to the first node;
   the first node, in response to receiving the probe response, confirming the link level connection with the second node and sending a single exchange identification (XID) request to the second node, the single XID request including information related to protocols supported by the first node; and
   the second node, in response to receiving the single exchange identification request, sending a single exchange identification (XID) response to the first node, the single XID response including information related to protocols supported by the second node; and
   wherein the single XID request and the single XID response together contain all the information needed to complete a successful link activation between the first and second nodes without requiring any further change of state of either the first node or the second node after the exchange of the probe command and the probe response.

2. The method of claim 1, wherein the step of sending the single exchange identification request comprises the steps of:
   identifying protocols supported by the first node;
   arranging, in a predetermined sequence, information related to the protocols supported by the first node; and
   forwarding the arranged information in the single XID request by the first node to the second node.

3. The method of claim 1, wherein:
   the information in the single XID response sent to the first node is arranged in a predetermined sequence.

4. The method of claim 1, wherein the single XID request identifies capabilities of the first node.

5. The method of claim 4, wherein:
   when the second node accepts the capabilities of the first node, the single XID response is a positive response; and
   the first node, in response to receiving said positive response, sends a message to the second node indicating successful link activation between the first and second nodes.

6. The method of claim 4, wherein if the second node cannot accept the capabilities of the first node, then the single XID response is a negative response and indicates capabilities of the second node.

7. The method of claim 6, wherein if the first node accepts the capabilities of the second node, then the first node sends to the second node a message indicating successful link activation between the first and second nodes.

8. The method of claim 7, wherein if the first node does not accept the capabilities of the second node, then the first node sends to the second node a message to complete failure of a link activation between the first and second nodes.

9. The method of claim 1, wherein:
   the first node is a client node or a host node;
   if the first node is the client node, then the second node is the host node; and
   if the first node is the host node, then the second node is the client node.

10. The method according to claim 1, wherein:
   all capabilities of the first node and all capabilities of the second node are received in the single one XID request and the single XID response.

11. A system for establishing a connection between a plurality of nodes in a communication network, the plurality of nodes including a first node and a second node, the system comprising:
   one or more processor units on the first node configured for verifying availability of the second node by sending a probe command to the second node to verify reachability of the second node and to initiate a link level connection between the first node and the second node; and
   one or more processor units on the second node and configured for sending, in response to receiving the probe command, a probe response to the first node;
   said one or more processor units on the first node being further configured for, in response to receiving the probe response, confirming the link level connection with the second node and sending a single exchange identification (XID) request to the second node, the single XID request including information related to protocols supported by the first node; and
   said one or more processor units on the second node being further configured for, in response to receiving the single XID request, sending a single exchange identification (XID) response to the first node, the single XID response including information related to protocols supported by the second node;
   wherein the single XID request and the single XID response together contain all the information needed to complete a successful link activation between the first and second nodes without requiring any further change of state of either the first node or the second node after the exchange of the probe command and the probe response.

12. The system of claim 11, wherein the single exchange identification request is sent by:
   identifying protocols supported by the first node;
   arranging, in a predetermined sequence, information related to the protocols supported by the first node; and
   forwarding the arranged information in the single XID request by the first node to the second node.

13. The system of claim 11, wherein:
   the information in the single XID response sent to the first node is arranged in a predetermined sequence.

14. The system of claim 11, wherein:
   the single ID request identifies capabilities of the first node;
   when the second node accepts the capabilities of the first node, the single XID response is a positive response;
   the first node, in response to receiving said positive response, sends a message to the second node indicating successful link activation between the first and second nodes;
   if the second node cannot accept the capabilities of the first node, then the single XID response is a negative response and indicates capabilities of the second node;
   if the first node accepts the capabilities of the second node, then the first node sends to the second node a message indicating successful link activation between the first and second nodes; and
   if the first node does not accept the capabilities of the second node, then the first node sends to the second node a message to complete failure of a link activation between the first and second nodes.

15. An article of manufacture comprising:

at least one computer usable device having computer readable program code logic tangibly embodied therein to execute a machine instruction in a processing unit for establishing a connection between a plurality of nodes in a communication network, the plurality of nodes including a first node and a second node, the computer readable program code logic when executing, performing the following steps:

verifying availability of the second node by the first node, including the first node sending a probe command to the second node to verify reachability of the second node and to initiate a link level connection between the first node and the second node, and the second node, in response to receiving the probe command, sending a probe response to the first node;

the first node, in response to receiving the probe response, confirming the link level connection with the second node and sending a single exchange identification (XID) request to the second node, the single XID request including information related to protocols supported by the first node; and the second node, in response to receiving the single exchange identification request, sending a single exchange identification (XID) response to the first node, the single XID response including information related to protocols supported by the second node; and wherein the single XID request and the single XID response together contain all the information needed to complete a successful link activation between the first and second nodes without requiring any further change of state of either the first node or the second node after the exchange of the probe command and the probe response.

16. The article of manufacture of claim 15, wherein the step of sending the single exchange identification request comprises the steps of:

identifying protocols supported by the first node;

arranging, in a predetermined sequence, information related to the protocols supported by the first node; and forwarding the arranged information in the single XID request by the first node to the second node.

17. The article of manufacture of claim 15, wherein:

the information in the single XID response sent to the first node is arranged in a predetermined sequence.

18. The article of manufacture of claim 15, wherein:

the single XID request identifies capabilities of the first node;

when the second node accepts the capabilities of the first node, the single XID response is a positive response;

the first node, in response to receiving said positive response, sends a message to the second node indicating successful link activation between the first and second nodes;

if the second node cannot accept the capabilities of the first node, then the single XID response is a negative response and indicates capabilities of the second node;

if the first node accepts the capabilities of the second node, then the first node sends to the second node a message indicating successful link activation between the first and second nodes; and if the first node does not accept the capabilities of the second node, then the first node sends to the second node a message to complete failure of a link activation between the first and second nodes.

\* \* \* \* \*